(12) United States Patent
Kim et al.

(10) Patent No.: US 10,891,468 B2
(45) Date of Patent: Jan. 12, 2021

(54) METHOD AND APPARATUS WITH EXPRESSION RECOGNITION

(71) Applicant: Samsung Electronics Co., Ltd., Suwon-si (KR)

(72) Inventors: Youngsung Kim, Suwon-si (KR); Chang Kyu Choi, Seongnam-si (KR); Byungln Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 16/168,177

(22) Filed: Oct. 23, 2018

(65) Prior Publication Data

US 2019/0205626 A1  Jul. 4, 2019

(30) Foreign Application Priority Data

Dec. 29, 2017  (KR) .......................... 10-2017-0183638

(51) Int. Cl.
*G06K 9/00* (2006.01)
*G06N 3/08* (2006.01)
(Continued)

(52) U.S. Cl.
CPC ......... *G06K 9/00302* (2013.01); *G06F 3/017* (2013.01); *G06K 9/00228* (2013.01);
(Continued)

(58) Field of Classification Search
CPC ........... G06K 9/00268; G06K 9/00302; G06K 9/00228; G06K 9/00288; G06K 9/6257; G06K 9/00315; G06K 9/6272; G06N 3/0454; G06N 3/08; G06N 3/0445; G06F 2203/011; G06F 3/012; G06F 3/017
See application file for complete search history.

(56) References Cited

U.S. PATENT DOCUMENTS 9,465,978 B2  10/2016  Hachisuka et al.
9,672,416 B2  6/2017  Zhang et al.
(Continued)

FOREIGN PATENT DOCUMENTS

JP  2015-176208 A  10/2015
KR  10-2016-0072705 A  6/2016
(Continued)

OTHER PUBLICATIONS

Ioannou et al.,"Emotion recognition through facial expression analysis based on a neurofuzzy network", Neural Networks 18 (2005), Elsevier, pp. 423-435. (Year: 2005).*
(Continued)

*Primary Examiner* — Said M Elnoubi
(74) *Attorney, Agent, or Firm* — NSIP Law

(57) ABSTRACT

A processor-implemented method includes obtaining an input image including a face of a user, extracting a feature from the input image, estimating a facial expression of the input image and an expressiveness of the facial expression of the input image corresponding to a determined expression intensity of the facial expression based on the extracted feature, normalizing the expressiveness of the facial expression of the input image to a universal expressiveness, and recognizing the facial expression based on the universal expressiveness.

24 Claims, 15 Drawing Sheets

(51) Int. Cl.
*G06N 3/04* (2006.01)
*G06K 9/62* (2006.01)
*G06F 3/01* (2006.01)

(52) U.S. Cl.
CPC ..... *G06K 9/00268* (2013.01); *G06K 9/00288* (2013.01); *G06K 9/6257* (2013.01); *G06N 3/0454* (2013.01); *G06N 3/08* (2013.01); *G06F 3/012* (2013.01); *G06F 2203/011* (2013.01)

(56) References Cited

U.S. PATENT DOCUMENTS

| | | | |
|---|---|---|---|
| 9,690,369 | B2 | 6/2017 | Chang |
| 9,706,040 | B2 | 7/2017 | Kadirvel et al. |
| 2010/0211536 | A1* | 8/2010 | Al-Fattah ............... E21B 49/00 706/21 |
| 2013/0250181 | A1 | 9/2013 | Zhang et al. |
| 2017/0185827 | A1* | 6/2017 | Yamaya ................. G10L 25/78 |
| 2018/0077095 | A1* | 3/2018 | Deyle ..................... G06F 40/30 |
| 2018/0330152 | A1* | 11/2018 | Mittelstaedt ....... G06K 9/00261 |
| 2019/0348037 | A1* | 11/2019 | Khullar ............... G10L 15/1815 |

FOREIGN PATENT DOCUMENTS

| | | |
|---|---|---|
| KR | 10-2016-0095735 A | 8/2016 |
| KR | 10-2017-0001106 A | 1/2017 |
| KR | 10-2017-0013623 A | 2/2017 |

OTHER PUBLICATIONS

Khorrami, Pooya, et al., "Do deep neural networks learn facial action units when doing expression recognition?", *Proceedings of the IEEE International Conference on Computer Vision Workshops*, Dec. 2015, pp. 19-27.

Jung, Heechul, et al., "Joint fine-tuning in deep neural networks for facial expression recognition", *Proceedings of the IEEE International Conference on Computer Vision*, Dec. 2015, pp. 2983-2991.

Fabian Benitez-Quiroz, C., et al., "Emotionet: An accurate, real-time algorithm for the automatic annotation of a million facial expressions in the wild", *Proceedings of the IEEE Conference on Computer Vision and Pattern Recognition*, Jun. 2016 (22 pages in English).

* cited by examiner

METHOD AND APPARATUS WITH EXPRESSION RECOGNITION

CROSS-REFERENCE TO RELATED APPLICATION

This application claims the benefit under 35 USC § 119(a) of Korean Patent Application No. 10-2017-0183638 filed on Dec. 29, 2017 in the Korean Intellectual Property Office, the entire disclosure of which is incorporated herein by reference for all purposes.

BACKGROUND

1. Field

This application relates to a method and apparatus with expression recognition.

2. Description of Related Art

A facial expression may be formed by the stimulation of face muscles caused by thought stimulation. Hardware expressive recognition may perform facial expression recognition through image processing with respect to visual cues extracted from an input image, for example.

Each individual has a different facial expressiveness or different changes in facial expression. For example, individuals may have different peak facial expressivenesses with respect to the same facial expression.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes obtaining an input image including a face of a user, extracting a feature from the input image, estimating a facial expression of the input image and an expressiveness of the facial expression of the input image corresponding to a determined expression intensity of the facial expression based on the extracted feature, normalizing the expressiveness of the facial expression of the input image to a universal expressiveness, and recognizing the facial expression based on the universal expressiveness.

The input image may include any one of a single image comprising a single frame. and a sequence image comprising a plurality of frames.

The extracting of the feature may include extracting a feature with respect to the facial expression of the input image based on a first neural network comprising layers trained with facial expressions which have different expressivenesses.

The estimating of the facial expression may include any one or any combination of estimating the facial expression of the input image by applying the feature to a classifier trained to classify the facial expression of the input image, and estimating the expressiveness of the facial expression of the input image by applying the feature to a second neural network trained to estimate the expressiveness of the facial expression of the input image.

The normalizing may include universally ranking the expressiveness of the facial expression of the input image by applying the expressiveness of the facial expression of the input image to a third neural network trained to universally rank the expressiveness of the facial expression of the input image through a comparison to an expressiveness of a pre-learned image, and normalizing the universally ranked expressiveness of the facial expression of the input image to the universal expressiveness based on a pre-defined normalization function.

The normalization function may be based on a maximum value of the expressiveness of the facial expression of the input image and a minimum value of the expressiveness of the facial expression of the input image.

The extracting of the feature may include extracting a feature with respect to the facial expression of each of a plurality of frames of the input image based on a first neural network including layers trained with facial expressions which have different expressivenesses.

The estimating of the facial expression may include any one or any combination of estimating the facial expression of each of the plurality of frames by applying the feature to a classifier trained to classify the facial expression of the input image, and estimating an expressiveness of the facial expression of each of the plurality of frames by applying the feature to a second neural network trained to estimate the expressiveness of the facial expression of the input image.

The normalizing may include universally ranking the expressiveness of the facial expression of each of the plurality of frames by applying the expressiveness of the facial expression of each of the plurality of frames to a third neural network trained to universally rank the expressiveness of the facial expression of each of the plurality of frames through a comparison to an expressiveness of a pre-learned image, and normalizing the universally ranked expressiveness of the facial expression of each of the plurality of frames to the universal expressiveness based on a pre-defined normalization function.

The method may include capturing the input image including the image of the user, and transmitting the captured image to a user interface.

The may include recognizing an emotion of the user based on the recognized facial expression.

The method may further include labeling the input image with a universal expressiveness corresponding to the input image.

In a general aspect, a processor-implemented method includes acquiring training images corresponding to different facial expressions and expressivenesses of the different facial expressions, extracting a feature with respect to a facial expression of each of the training images based on a first neural network, classifying the facial expression of each of the training images based on the feature, training a second neural network to estimate the expressiveness of the facial expression corresponding to each of the training images based on the feature, and training a third neural network to universally rank the expressiveness of the facial expression corresponding to each of the training images.

The method may include training the first neural network by applying the training images to the first neural network comprising shared convolutional layers configured to extract a feature with respect to an expression of a facial image.

The second neural network may include recurrent layers configured to estimate the expressiveness of the facial expression corresponding to each of the training images, and the training of the second neural network comprises training the second neural network by applying the extracted feature to the second neural network.

The training of the second neural network may include training the second neural network to estimate the expressiveness of the facial expression corresponding to each of the training images by individually ranking the expressiveness of the facial expression corresponding to each of the training images with respect to each user.

The third neural network may include recurrent layers configured to universally rank the expressiveness of the facial expression corresponding to each of the training images by comparing the expressiveness of the facial expression to an expressiveness of a pre-learned image, and the training of the third neural network may include training the third neural network to universally rank the expressiveness of the facial expression corresponding to each of the training images by applying the expressiveness of the facial expression corresponding to each of the training images to the third neural network.

In a general aspect, an apparatus includes an input interface configured to acquire an input image of a face of a user, and a processor configured to extract a feature from the input image, estimate a facial expression of the input image and an expressiveness of the facial expression of the input image corresponding to an expression intensity of the expression based on the extracted feature, normalize the expressiveness of the facial expression of the input image to a universal expressiveness, and recognize the facial expression based on the universal expressiveness.

The processor may be further configured to extract the feature with respect to the facial expression of the input image based on a first neural network comprising layers trained with facial expressions having different expressivenesses.

The processor may be further configured to perform any one or any combination of estimating the facial expression of the input image by applying the extracted feature to a classifier trained to classify the facial expression of the input image, and estimating the expressiveness of the facial expression of the input image by applying the extracted feature to a second neural network trained to estimate the expressiveness of the input image.

The processor may be further configured to universally rank the expressiveness of the facial expression of the input image by applying the expressiveness of the facial expression of the input image to a third neural network trained to universally rank the expressiveness of the facial expression of the input image by comparing the facial expression of the input image to an expressiveness of a pre-learned image, and normalize the universally ranked expressiveness of the facial expression of the input image based on a pre-defined normalization function.

Other features and aspects will be apparent from the following detailed description, the drawings, and the claims.

Figure 1A:
FIGS. 1A through 1C illustrate an example of different expressivenesses of users with respect to the same expression.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one layer, groups of layers, layer portions, member, component, region, layer, or section from another member, component, region, layer, or section. Thus, a first layer, groups of layers, layer portions, member, component, region, or section referred to in examples described herein may also be referred to as a second layer, groups of layers, layer portions, member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Examples set forth hereinafter may be used to recognize an emotion of a user by various example devices based on a facial expression captured by such or other various devices. As a non-limiting example, such devices may include a smart phone, wearable device, and/or a tablet or other computing device example. The examples may be used to recognize an expression and/or an emotion of a user based on facial expressions that are captured by any devices such as a home robot, an intelligent personal assistant robot, an audience measurement, a smart phone, or an augmented reality/virtual reality (AR)/VR) device. The examples may be implemented in a form of a chip to be mounted on the above-mentioned devices. Hereinafter, the examples will be described in detail with reference to the accompanying drawings, wherein like drawing reference numerals are used for like elements. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Figure 1B:
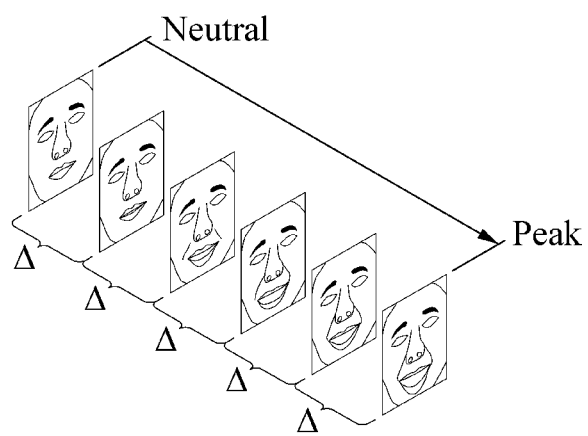
Figure 1C:
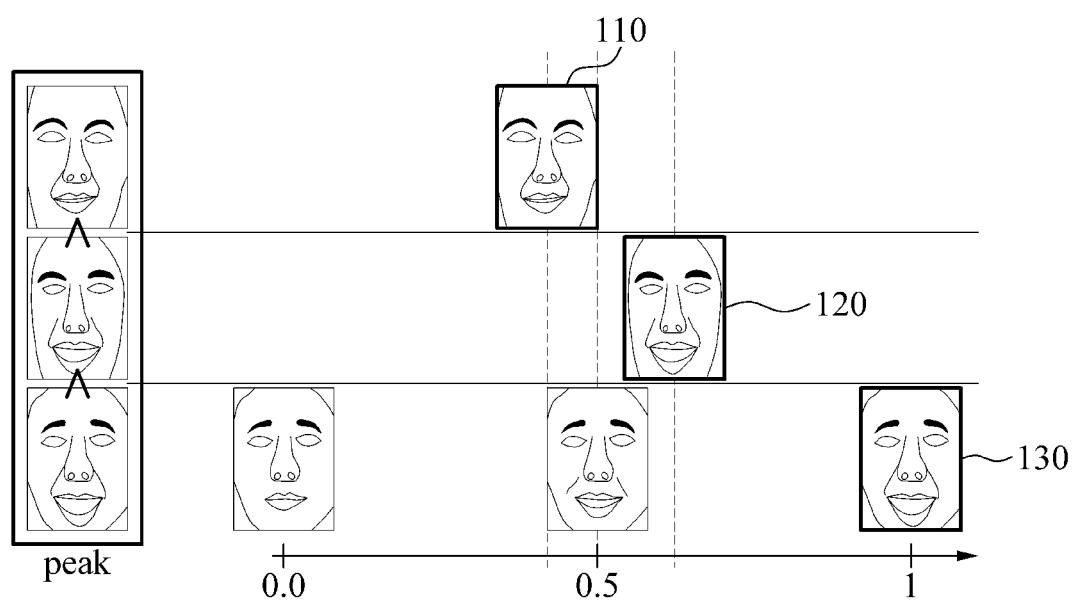

FIGS. 1A through 1C illustrate an example of different expressivenesses of users with respect to the same expression. Referring to FIG. 1A, expression sequences of users 110, 120, and 130 with respect to the same expression are shown. In this example, an expressiveness with respect to the same expression of an emotion in an expression sequence sequentially changes by a difference value of delta (Δ), as shown in FIG. 1B. Further, the expressiveness is ranked based on the difference value of Δ.

In the example of FIG. 1A, the user 110, the user 120, and the user 130 may sequentially change their impassive neutral expressions to peak happy expressions.

In this example, an expression of a user is expressed by Equation 1.

$$\tilde{x} = x_0 + \varepsilon, \text{ where } \tilde{x}, x_0 \in R^{w \times h} \qquad \text{Equation 1}$$

In Equation 1, $x_0$ denotes a reference expression (neutral expression), and $\tilde{x}$ denote a new expression, for example, an expression of sadness, joy, happiness, or surprise. $\varepsilon$ denotes a difference between the reference expression and the new expression (expression variance).

The new expression corresponds to a state to which the reference expression changes by a latent factor of the expression variance $\varepsilon$. By consecutively adding or deducting the expression variance $\varepsilon$, similar to Δ, the expressiveness changes and a new expressiveness forms an expression.

However, users have different expressivenesses with respect to the same expression, and thus have different peak expressivenesses.

For example, the user 110 and the user 120 have moderate changes in expression, and the user 130 has a great change in expression. In this example, in a case of universally (absolutely) evaluating expressivenesses of the users 110, 120, and 130 although all the user 110, the user 120, and the user 130 show peak happy expressions, the users 110, 120, and 130 have different universal expressivenesses as shown in FIG. 1C.

In an example in which an expressiveness of a neutral expression is set to "0" and an expressiveness of a peak happy expression is set to "1", an expressiveness of the peak happy expression of the user 130 who has a greatest change in expression, among the users 110, 120, and 130, is determined to be "1". Further, expressivenesses of the peak happy expressions of the users 110 and 120 who have moderate changes in expression are determined to be relative values compared to the maximum expressiveness "1" of the user 130.

For example, the peak happy expression (smiling expression) of the user 110 has a smaller expression variance than a medium ("0.5") happy expression (grinning expression) of the user 130. In this example, the expressiveness of the peak happy expression (smiling expression) of the user 110 is determined to be "0.45". Further, the peak happy expression (beaming expression) of the user 120 has a greater expression variance than the medium ("0.5") happy expression (grinning expression) of the user 130. In this example, the expressiveness of the peak happy expression (beaming expression) of the user 120 is determined to be "0.6".

By normalizing an expressiveness of an individual user to a universal expressiveness in view of a relative difference in expressiveness between users with respect to the same expression, an expressiveness of an expression and/or an objective index with respect to an emotional expression may be provided. Further, an emotional state may be verified by verifying an expressiveness range of a user, and an index for affective inference in addition to an emotion of the user is provided. For example, a personality of each user may be inferred from universal expressivenesses with respect to various emotions.

Figure 2:
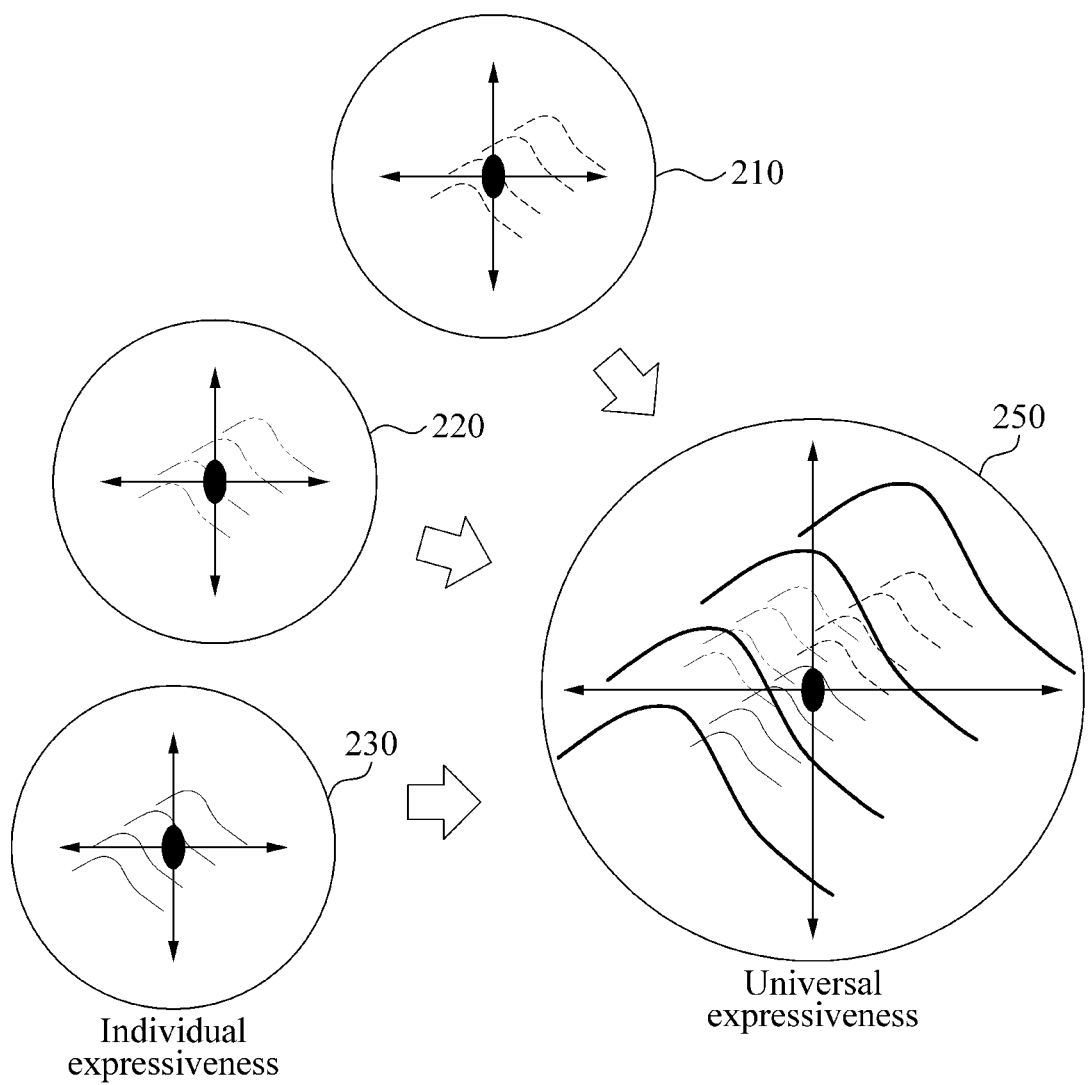
FIG. 2 illustrates an example of a relationship between individual expressivenesses and universal expressivenesses of users.

FIG. 2 illustrates an example of a relationship between individual expressivenesses and universal expressivenesses of users. Referring to FIG. 2, graphs 210, 220, 230 showing individual expressivenesses of each of a plurality of users with respect to predetermined expressions, and a graph 250 showing universal expressivenesses of all the plurality of users with respect to the predetermined expressions, are illustrated. In the graphs 210, 220, 230, the individual expressivenesses of each of the plurality of users with respect to the predetermined expressions are represented by broken lines, dash-dot-dot lines, and solid lines. Further, in the graph 250, the universal (or absolute) expressivenesses of all the plurality of users with respect to the predetermined expressions are represented by thick solid lines.

In an example, a ranked expressiveness of all the plurality of users with respect to each expression is determined based on a ranked expressiveness of each of the plurality of users with respect to each expression. In this example, an individual expressiveness of a user is newly added, the ranked expressiveness of all the plurality of users with respect to each expression is also updated or corrected by reflecting the newly added individual expressiveness.

An example of representing an individual expressiveness of each of a plurality of users as a universal expressiveness of all the plurality of users will be described further below.

Figure 3:
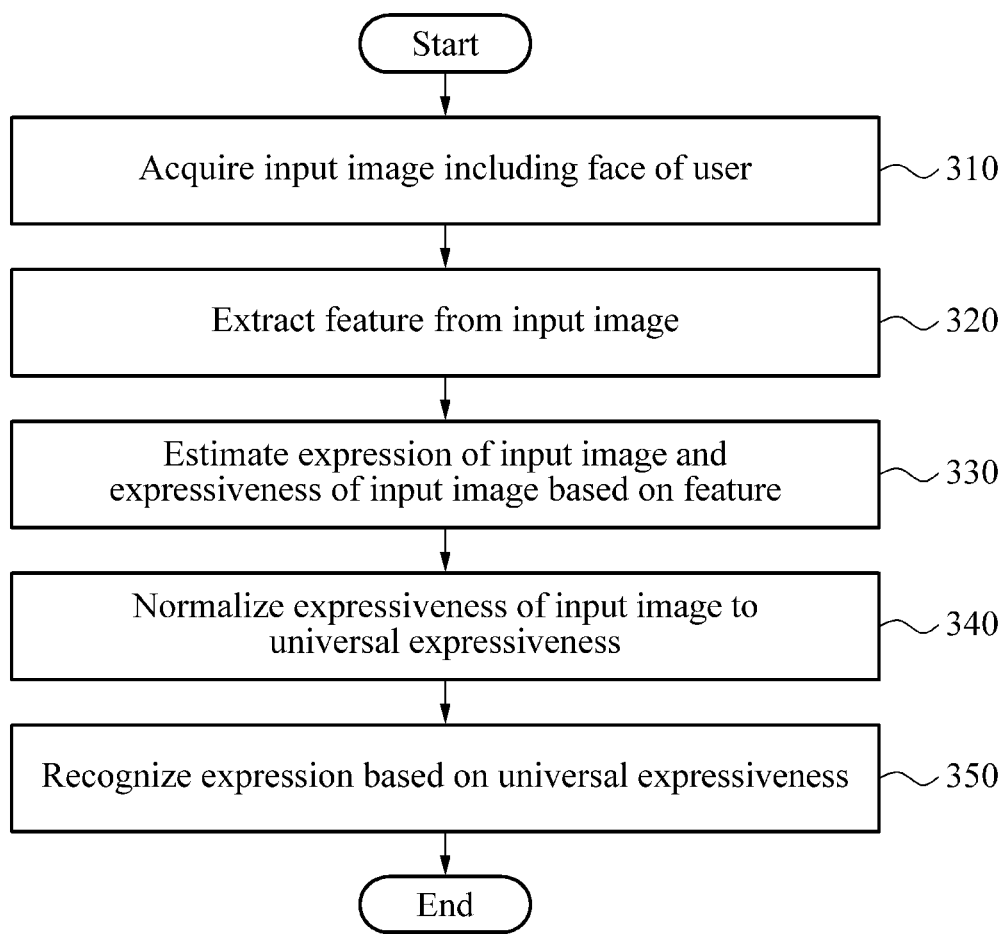
FIG. 3 illustrates an example of an expression recognizing method.

FIG. 3 illustrates an example of an expression recognizing method.

The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware or other processors and computer instructions.

In addition to the description of FIG. 3 below, the descriptions of FIGS. 1A, 1B, 1C, and 2 are also applicable to FIG. 3, and are incorporated herein by reference. Thus, the above description may not be repeated here.

Referring to FIG. 3, in operation 310, an expression recognizing apparatus acquires an input image including a face of a user. The input image may include, for example, a single image including a single frame, and a sequence image (moving picture) including a plurality of frames. The input image may be input through an input interface 1310 of FIG. 13, or captured or photographed through a sensor 1340 of FIG. 13.

In operation 320, the expression recognizing apparatus extracts a feature from the input image. The expression recognizing apparatus extracts a feature with respect to an expression of the input image using a first neural network or network portion including layers that have been trained with expressions having different expression intensities (expressivenesses) or different expression variances. Here, the feature corresponds to a feature vector indicating a feature of a facial expression. The first neural network includes, for example, shared convolutional layers trained with expressions having different expression intensities.

In operation 330, the expression recognizing apparatus estimates an expression of the input image and an expressiveness of the input image based on the extracted feature. In this example, the expressiveness of the input image is a value corresponding to an expression intensity of the expression shown in the input image, and is expressed using a value between "0" and "1", for example, "0.2" or "0.8".

The expression recognizing apparatus estimates the expression of the input image by applying the extracted feature to a classifier trained to classify the expression of the input image. The expression of the input image is estimated to be, for example, neutrality, surprise, anger, happiness, joy, or sadness. In another example, the expression recognizing apparatus estimates the expressiveness of the input image by applying the extracted feature to a second neural network or network portion having been trained to individually rank the expressiveness of the input image with respect to each user. The second neural network includes layers trained to estimate the expressiveness of the input image by individually ranking the expressiveness of the expression of the input image with respect to each user.

In operation 340, the expression recognizing apparatus normalizes the estimated expressiveness of the input image to a universal expressiveness. The expression recognizing apparatus universally ranks the expressiveness of the input image by applying the estimated expressiveness of the input image to a third neural network or network portion. The third neural network (or network portion) includes layers that have been trained to universally rank the expressiveness of an input image through a comparison to an expressiveness of a pre-learned image.

In an example, the expression recognizing apparatus universally ranks the expressiveness of the input image through a comparison to an estimated expressiveness of a previously input image. Here, the previously input image is an image other than the input image, and the estimated expressiveness of the previously input image is an expressiveness estimated by the expression recognizing apparatus based on the previously input image.

In operation 340, the expression recognizing apparatus normalizes the universally ranked expressiveness of the input image to the universal expressiveness based on a pre-defined normalization function. The normalization function corresponds to a function that outputs a normalized universal expressiveness value with respect to an input image including a facial expression of a user.

A normalization function E' is based on a maximum value $E_{max}$ of the expressiveness of the input image and a minimum value $E_{min}$ of the expressiveness of the input image, as expressed by Equation 2.

$$E' = \frac{E - E_{min}}{E_{max} - E_{min}}. \qquad \text{Equation 2}$$

In Equation 2, E' denotes a normalized expressiveness of the input image, that is, a universal expressiveness, and E denotes the expressiveness of the input image. $E_{max}$ denotes the maximum value of the expressiveness of the input image, and $E_{min}$ denotes the minimum value of the expressiveness of the input image.

In this example, the maximum value and the minimum value of the expressiveness of the input image may be determined based on rankings determined in the process of universally ranking the expressiveness of the input image. For example, the maximum value of the expressiveness of the input image is an expressiveness corresponding to a highest ranking, among universally ranked expressivenesses of the input image. Further, the minimum value of the expressiveness of the input image is an expressiveness corresponding to a lowest ranking, among the universally ranked expressivenesses of the input image.

The third neural network (or network portion) may have been trained to universally rank a variable-length expression sequence through sequential learning. An example in which the expression recognizing apparatus normalizes the expressiveness of the input image to the universal expressiveness will be described further with reference to FIG. 4.

In operation 350, the expression recognizing apparatus recognizes an expression based on the normalized universal expressiveness.

In an example, the expression recognizing apparatus provides an objectified expressiveness index with respect to the input image by labeling the input image with the normalized universal expressiveness corresponding to the input image.

Figure 4:
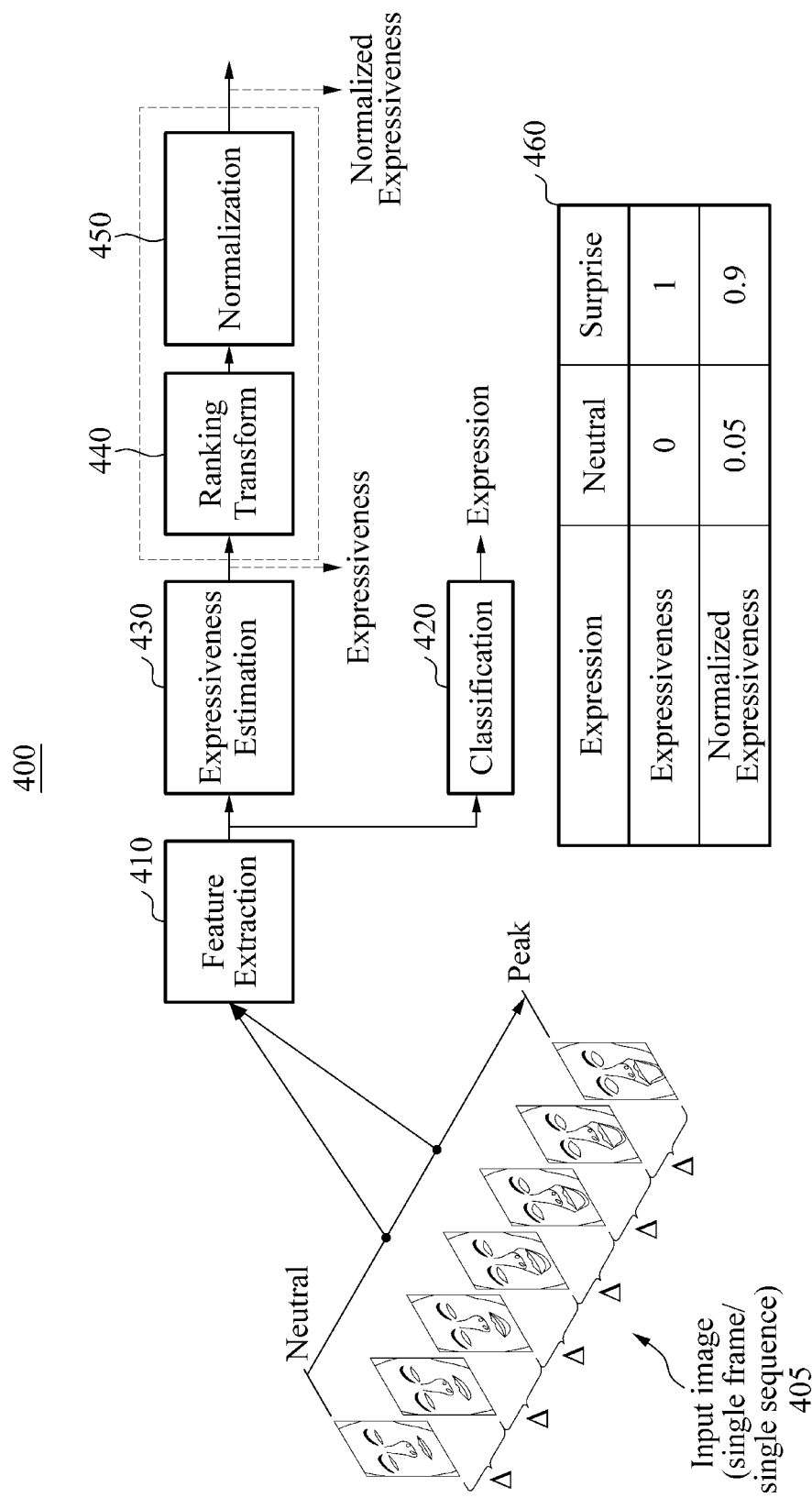
FIGS. 4 and 5 illustrate examples of structures and operations of expression recognizing apparatuses.

FIG. 4 illustrates an example of a structure and an operation of an expression recognizing apparatus. Referring to FIG. 4, in operation 410, an expression recognizing apparatus extracts a facial feature with respect to a facial expression from an input image 405 including a facial expression of a user. In this example, the input image 405 may be, for example, a single frame or a single sequence image including a plurality of frames, as shown in FIG. 4. Hereinafter, an example in which the input image 405 is a sequence image including a plurality of frames will be described. In operation 410, in response to a frame in a sequence image being input into the expression recognizing apparatus, a first neural network including convolutional layers outputs a feature vector with respect to an expression corresponding to the input frame.

In operation 420, the expression recognizing apparatus estimates an expression of the input image by applying the extracted feature to a classifier having been trained to classify the expression of the input image. In this example, the estimated expression of the input image is, for example, a neutral expression or a surprise expression as written in an expression field of a table 460.

In operation 430, the expression recognizing apparatus estimates an expressiveness of the expression of the input image based on the extracted feature. The expression recognizing apparatus estimates the expressiveness of the input image by applying the extracted feature to a second neural network (or network portion) having been trained to estimate the expressiveness of the expression of the input image. In response to an input of feature vectors with respect to expressions corresponding to a plurality of frames, the second neural network estimates the expressiveness of the input image by ranking the feature vectors as individual expressivenesses of users. That is, the expressiveness estimated by the second neural network corresponds to an individual expressiveness of each user. As a non-limiting example, the resultant individual expressiveness of each user may have a value of "0" with respect to the neutral expression, or a value of "1" with respect to the surprise expression, as written in an expressiveness field of the table 460.

As described further below, depending on a learning scheme of the example second neural network, the individual expressiveness of each user is also referred to as a "primarily universalized expressiveness". The expressiveness output from the second neural network in operation 430 is a primarily universalized expressiveness, and an operation related thereto will be described further through operation 870 of FIG. 8.

In response to an input of the estimated expressiveness of the input image, that is, the primarily universalized expressiveness, the expression recognizing apparatus universally ranks the expressiveness of the input image through a third neural network, in operation 440. In this example, outputs corresponding to frames in the sequence, for example, primarily universalized expressivenesses, are sequentially input into the third neural network (or network portion). The expressiveness of the input image input into an input layer of the third neural network and the universally ranked expressiveness of the input image output from the third neural network each have a value of, for example, [0, 1].

As described below, depending on a learning scheme implemented in having trained the third neural network, the universally ranked expressiveness output from the third neural network is also referred to as a "secondarily universalized expressiveness". An operation related to the secondarily universalized value (expressiveness) output in operation 440 will be described further through a loss 860 of FIG. 8.

In operation 450, the expression recognizing apparatus normalizes the universally ranked expressiveness of the input image to a universal expressiveness. The expressiveness normalized in operation 450 may have a value of "0.05" with respect to the neutral expression and a value of "0.9" with respect to the surprise expression, as written in a normalized expressiveness field of the table 460.

As described further below, the third neural network has been trained to output a normalized expressiveness. Thus, operation 450 may be included or excluded according to a design. In an example of including operation 450, the expression recognizing apparatus may output a final expressiveness based on a predetermined normalization function, for example, Equation 2. In an example of excluding operation 450, the expression recognizing apparatus may utilize the secondary universalized expressiveness output in operation 440 as the final expressiveness.

Figure 5:
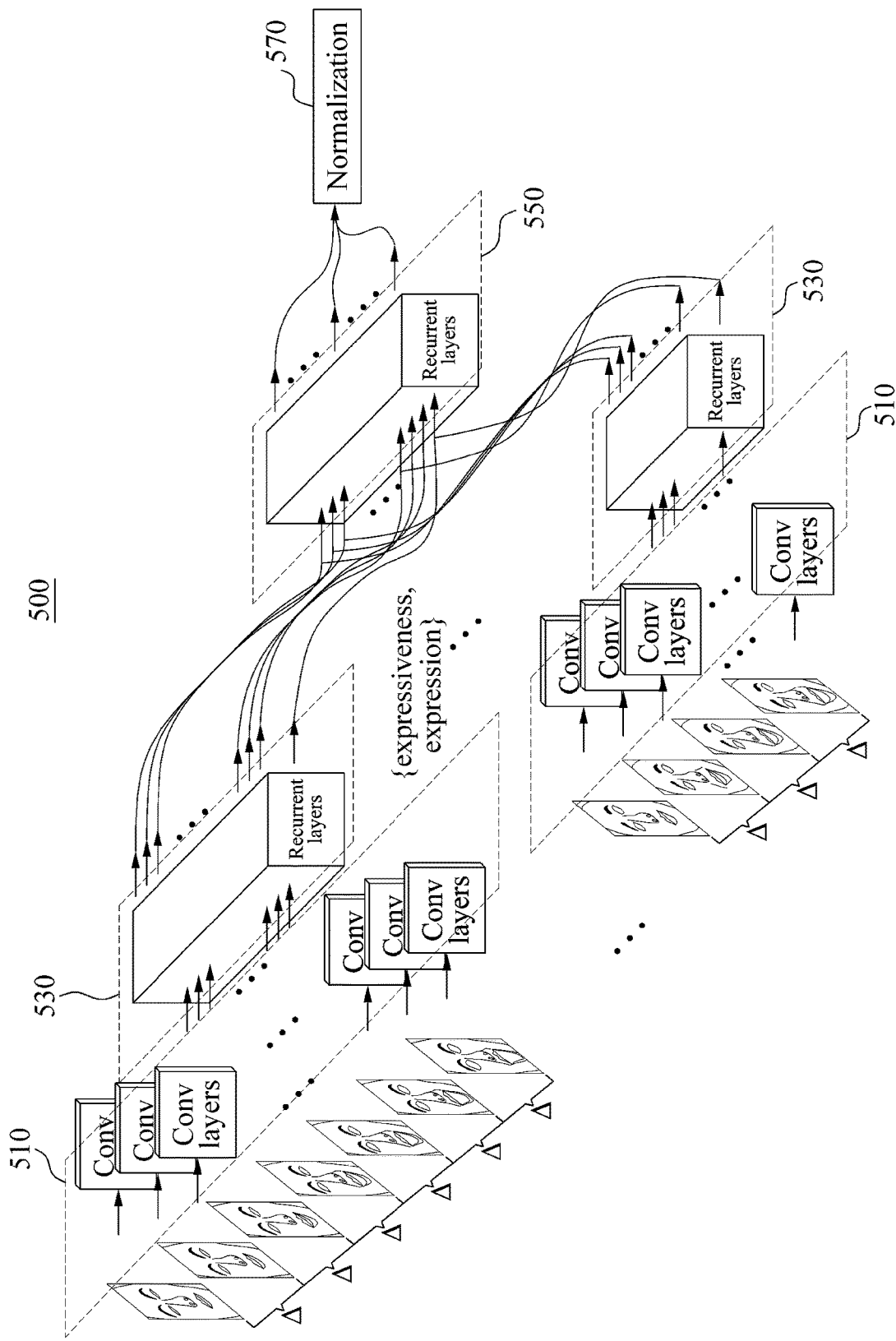

FIG. 5 illustrates an example of a structure and an operation of an expression recognizing apparatus. Referring to FIG. 5, an expression recognizing apparatus 500 including a deep neural network (DNN), as a non-limiting example, that calculates a normalized output of a two-dimensional (2D) tuple {expression, expressiveness} is illustrated. In FIG. 5, an input image includes a plurality of sequences including a plurality of frames. The DNN may be one or more of a fully connected network, a deep convolutional network, and/or a recurrent neural network, or may include different or overlapping neural network portions respectively with such full, convolutional, or recurrent connections, or other machine learning structure, as non-limiting examples.

The expression recognizing apparatus 500 includes, for example, a deep network including first neural networks 510, second neural networks 530, a third neural network 550, and a normalization layer 570. The first neural networks 510, the second neural networks 530, and the third neural network 550 may each have a structure of recurrent layers, and thus process the input image irrespective of the number of frames included in the input image. In an example, the first neural network, the second neural network, and the third neural network may correspond to other or both of the first, second, and third neural networks discussed above with respect to FIGS. 3 and 4, and also as discussed below as having been respectively trained in the operations of FIGS. 7 and 8.

The expression recognizing apparatus 500 estimates (determines) an expressiveness with respect to facial expressions of images in each frame from consecutive expression sequences through the deep neural network, and calculates an expressiveness with respect to each facial expression sequence in a normalized form.

In detail, the first neural networks 510 extract features with respect to facial expressions of images in the plurality of frames of the input image through shared convolutional layers trained with expressions having different expression intensities. The first neural networks 510 convert the input image including a facial expression of a user into another-dimensional information, for example, feature vectors.

The second neural networks 530 are neural networks trained to estimate an expressiveness of the input image, such as discussed above with regard to FIGS. 3 and 4, or below with regard to FIGS. 7 and 8, noting examples are non-limiting thereto. The expression recognizing apparatus 500 estimates expressivenesses of the plurality of frames by applying the features extracted by the first neural networks 510 to the second neural networks 530. Frames output from the first neural networks 510 are sequentially input into the second neural networks 530. For example, features corresponding to frames in a first sequence are sequentially input, and then features corresponding to frames in a second sequence are sequentially input. In this example, the expressivenesses of the plurality of frames correspond to individual expressivenesses of the facial expressions of users.

The expressivenesses of the facial expressions of images in the plurality of frames estimated by the second neural networks 530 undergo a ranking process through statistics for each facial expression sequence at the third neural network 550, and are output as universal expressivenesses normalized by the normalization layer 570. In this example, the third neural network 550 sequentially outputs the normalized universal expressivenesses of the facial expressions of images in the frames based on an order in which the expressivenesses of the facial expressions of images in the plurality of frames are input into the third neural network 550. As described further with reference to FIG. 9, in an example, the third neural network 550 may further output universal rankings with respect to the expressivenesses of the plurality of frames.

In an example, the expression recognizing apparatus 500 may further include classifiers (not shown) trained to classify the facial expression of the input image. In this example, the expression recognizing apparatus 500 estimates the facial expressions of the images in the plurality of frames by applying the features extracted by the first neural networks 510 to the classifiers.

The third neural network 550 is a neural network trained to universally rank the expressivenesses of the plurality of facial expressions of images in the frames through a comparison to an expressiveness of a pre-learned image, such as discussed above with regard to FIGS. 3 and 4, or below with regard to FIGS. 7 and 8, noting examples are non-limiting thereto. The expression recognizing apparatus 500 universally ranks the expressivenesses of the facial expressions of images in the plurality of frames by applying the expressivenesses of the facial expressions of images in the plurality of frames to the third neural network 550.

The normalization layer 570 normalizes the universally ranked expressivenesses of the facial expressions of images in the plurality of frames to universal expressivenesses based on a pre-defined normalization function.

In an example, a ranking process with respect to facial expression sequences including a plurality of frames calculates a more accurate expressiveness through a comparison of frames, when compared to a single frame based ranking process.

Figure 6:
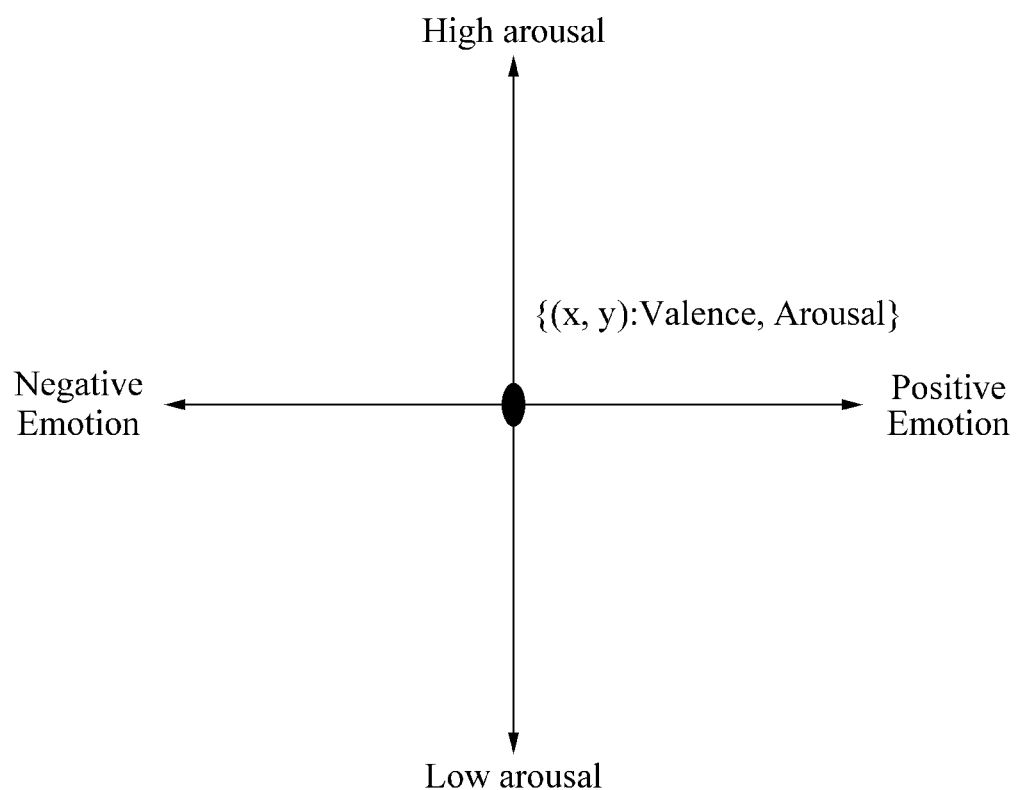
FIG. 6 illustrates an example of a two-dimensional (2D) tuple of valence and arousal representing an expressiveness of an emotion.

FIG. 6 illustrates an example of a two-dimensional (2D) tuple of valence and arousal representing an expressiveness of an expression. The expression may refer to an emotion of a user, which may range from sadness to happiness as non-limiting examples. In a graph of FIG. 6, an X-axis indicates a direction of emotion from negative emotions such as anger and sadness, to positive emotions such as joy and happiness, that is, a valence of an emotion, and a Y-axis denotes a level of arousal.

Without considering a relative difference in peak expressiveness between individuals, it may be difficult to use an expressiveness of an emotion as an index to recognize different emotions.

In an example, an emotion of a user and an expressiveness of the emotion are represented by a 2D tuple of {(x,y): valence, arousal}, instead of a 2D tuple of {expression, expressiveness}. Here, the valence is a direction of emotion and is defined similar to the above-mentioned emotions, and the arousal is a quantity of physical response and is defined similar to expressivenesses of the above-mentioned emotions.

Figure 7:
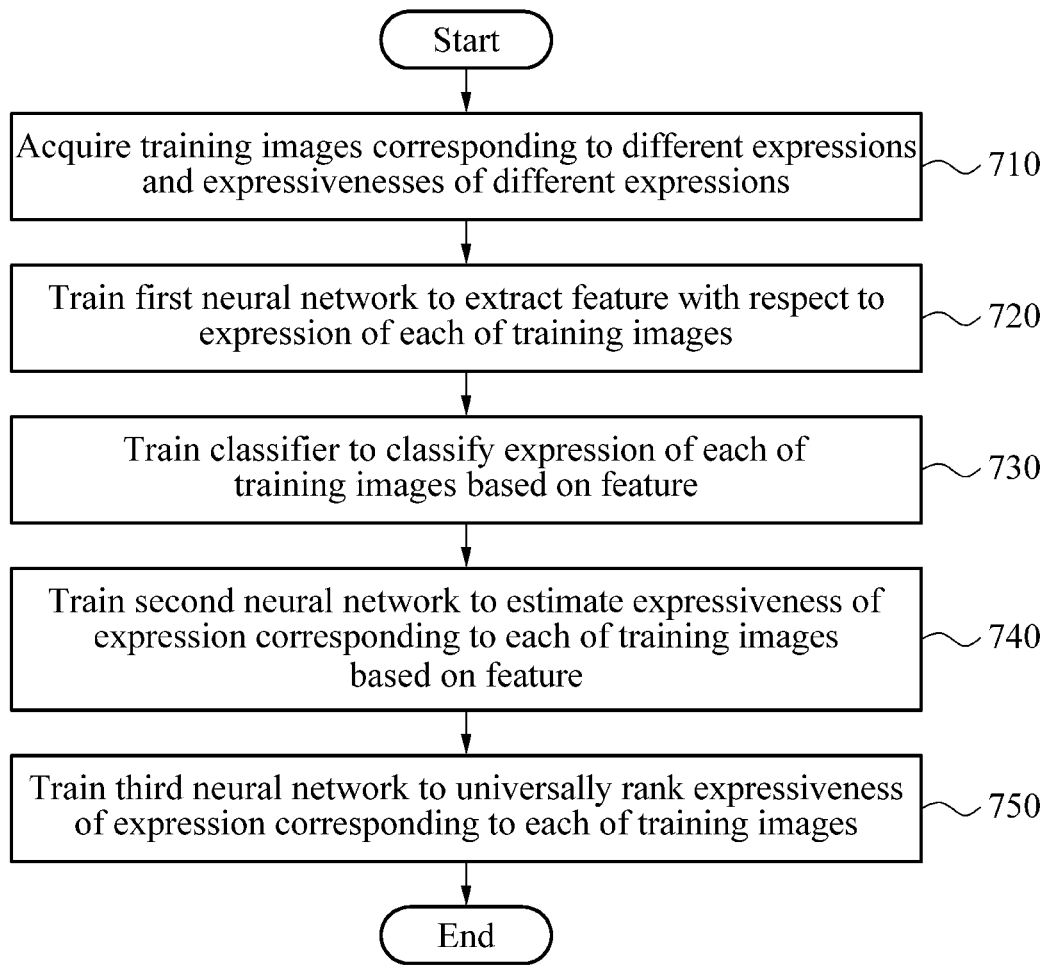
FIG. 7 illustrates an example of a training method for expression recognition.

FIG. 7 illustrates an example of a training method for expression recognition.

The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware or one or more processors and computer instructions.

In addition to the description of FIG. 7 below, the descriptions of FIGS. 1A, 1B, 1C, and 2-6 are also applicable to FIG. 7, and are incorporated herein by reference. Thus, the above description may not be repeated here.

Referring to FIG. 7, in operation 710, a training apparatus for expression recognition, hereinafter, the "training apparatus", acquires training images corresponding to different facial expressions and expressivenesses of the different facial expressions.

In operation 720, the training apparatus extracts a feature with respect to the facial expression of each of the training images based on an initial first neural network. The training apparatus trains the initial first neural network by applying the training images to the initial first neural network including shared convolutional layers that extract a feature with respect to an expression of a facial image such as by implementing basic propagation approaches, until the first neural network is trained to a predefined accuracy and/or a predetermined minimum inaccuracy.

In operation 730, the training apparatus trains an initial classifier to classify the facial expression of each of the training images based on the extracted feature.

In operation 740, the training apparatus trains a second neural network to estimate an expressiveness of the facial expression corresponding to each of the training images based on the extracted feature. The second neural network includes recurrent layers that estimate the expressivenesses of the facial expression corresponding to each of the training images. The training apparatus trains the second neural network by applying the extracted feature to the second neural network. The training apparatus trains the second neural network to estimate the expressiveness of the facial expression corresponding to each of the training images by individually ranking the expressiveness of the facial expression corresponding to each of the training images with respect to each user.

In operation 750, the training apparatus trains an initial third neural network to universally rank the expressiveness of the facial expression corresponding to each of the training images. The initial third neural network may include recurrent layers that universally rank the expressiveness of the facial expression corresponding to each of the training images through a comparison to an expressiveness of a pre-learned image. The training apparatus trains the initial third neural network to universally rank the expressiveness of the facial expression corresponding to each of the training images by applying the expressiveness of the facial expression corresponding to each of the training images to the initial third neural network.

As an example, such initial neural network portions may have initialized parameters or other initial parameters preset for the corresponding training operations. The resultant training neural networks (or network portions) thus will have trained parameters, which can be applied to implement the respective neural networks for their respective trained objectives.

Figure 8:
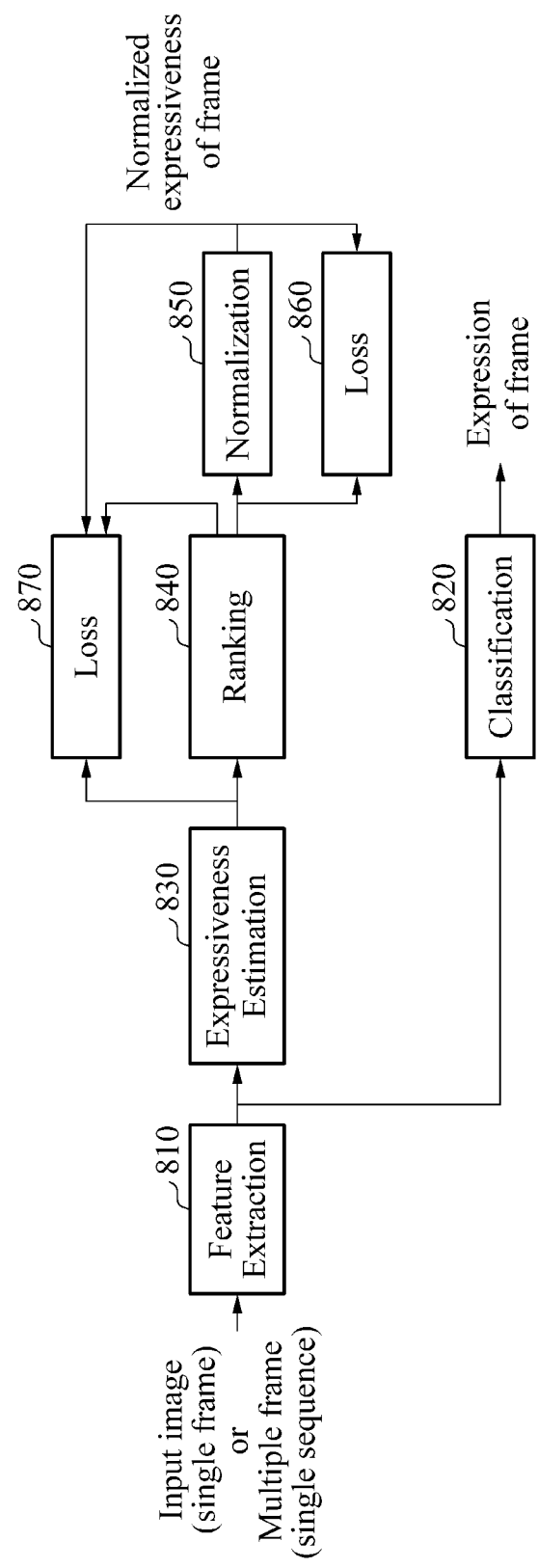
FIGS. 8 through 10 illustrate examples of structures and operations of training apparatuses for expression recognition.

FIG. 8 illustrates an example of a structure and an operation of a training apparatus for expression recognition. In an example, the training apparatus may correspond to the expression apparatus of FIGS. 5, 9, 10 and 13, e.g., to both perform training and inference operations for expression determining by implementing the trained neural networks, and may be one or more separate apparatus(es) that perform the training. Referring to FIG. 8, in operation 810, the training apparatus for expression recognition, hereinafter, the training apparatus, trains a first neural network to extract a feature with respect to an expression of each of training images corresponding to different expressions and expressivenesses of the different facial expressions. The training apparatus trains the first neural network by applying the training images to the first neural network including shared convolutional layers that extract a feature with respect to an expression of a facial image.

For example, in response to a frame in a sequence of the training images being input into the training apparatus, the first neural network including the convolutional layers outputs a feature vector with respect to an expression corresponding to a facial expression included in the input frame.

In operation 820, the training apparatus trains a classifier to classify the facial expression of each of the training images based on the feature extracted by the first neural network. The training apparatus estimates the facial expression of each of the training images by applying the extracted feature to the classifier trained to classify the facial expression of each of the training images.

In operation 830, the training apparatus trains a second neural network to estimate an expressiveness of the facial expression corresponding to each of the training images based on the feature extracted by the first neural network. In response to an input of feature vectors with respect to the facial expression corresponding to each of the training images, the second neural network estimates the expressiveness of each of the training images by ranking the feature vectors as individual expressivenesses of users. As described above, the individual expressiveness of each user is also referred to as a "primarily universalized expressiveness".

In operation 830, the second neural network is trained such that the expressiveness of each of the training images reflects the primarily universalized expressiveness by a loss 870.

In an example, the second neural network is trained to reflect the primarily universalized expressiveness based on a label of training data, instead of the loss 870. The first neural network and the second neural network are pre-trained based on training data and a label of the corresponding training data. In this example, the label of the training data indicates a universalized expressiveness.

In operation 840, the training apparatus trains a third neural network to universally rank the expressiveness of the facial expression corresponding to each of the training images by applying the estimated expressiveness of each of the training images to the third neural network. The third neural network includes layers trained to universally rank the expressiveness of the facial expression corresponding to each of the training images through a comparison to an expressiveness of a pre-learned image. The universally ranked expressiveness output from the third neural network is also referred to as a "secondarily universalized expressiveness". In operation 840, the third neural network is trained such that the expressiveness of each of the training images reflects the secondarily universalized expressiveness by a loss 860. The loss 860 corresponds to a loss used to train the third neural network to output a normalization result of operation 850.

In operation 850, the training apparatus trains normalization layers to normalize the universally ranked expressiveness of the expression to a universal expressiveness based on a pre-defined normalization function, for example, Equation 2.

Figure 9:
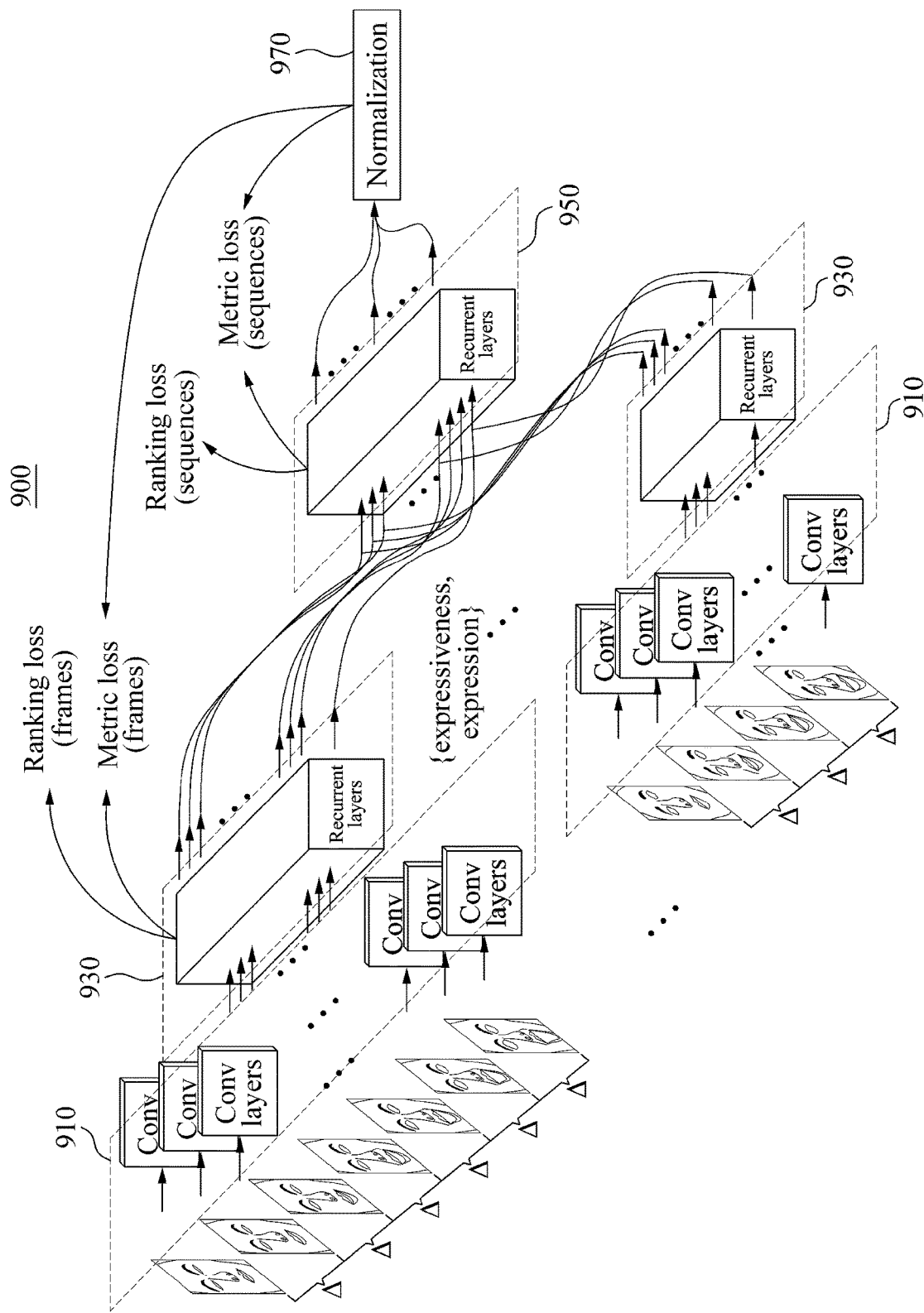

FIG. 9 illustrates an example of a structure and an operation of a training apparatus for expression recognition. Referring to FIG. 9, a training apparatus 900 includes, for example, a deep neural network (DNN) including first neural networks 910, second neural networks 930, a third neural network 950, and a normalization layer 970. In an example, the training apparatus may correspond to the expression apparatus of FIGS. 5, 8, 10 and 13, e.g., to both perform training and inference operations for expression determining by implementing the trained neural networks, and may be one or more separate apparatus(es) that perform the training.

The training apparatus 900 is trained to define an expressiveness with respect to the facial expression of images in each frame from consecutive expression sequences (training sequences) through the deep neural network, and calculate and output an expressiveness with respect to each facial expression sequence in a normalized form.

In detail, the first neural networks 910 extract features with respect to facial expressions of a plurality of frames included in the training sequences through shared convolutional layers trained with expressions having different expressive intensities. The first neural networks 910 may convert the training sequences including facial expressions of users into another-dimensional information.

The second neural networks 930 are trained to estimate expressivenesses of facial expressions of images in the plurality of frames included in the training sequences. The training apparatus 900 estimates the expressivenesses of facial expressions of images of the plurality of frames by applying the features extracted by the first neural networks 910 to the second neural networks 930. In this example, a ranking loss with respect to the frames (Ranking loss (frames)) and/or a metric loss with respect to the frames (Metric loss(frames)) occur in the second neural networks 930. The metric loss with respect to the frames is a loss occurring in a process of converting each frame to metric, and corresponds to the loss 870 of FIG. 8. The ranking loss with respect to the frames corresponds to a loss occurring in a process of ranking each frame. For example, in a case of a single frame, a point wise ranking loss such as a distance minimization loss occurs in a regression process. Further, in a case of a plurality of frames, a pair wise ranking loss occurs in a process of determining a size of a pair.

In an example, the ranking loss with respect to the frames is further used to train the second neural networks 930. In this example, the second neural networks 930 further output rankings of frames in a single sequence. The rankings of the frames indicate an order in which the frames are arranged based on expressivenesses of the facial expressions. The ranking loss is used to train the second neural networks 930 such that the rankings output from the second neural networks 930 accord with actual rankings. The expressivenesses facial expressions of the images of the plurality of frames estimated by the second neural networks 930 undergo a ranking process through statistics for each training sequence at the third neural network 950, and are output as universal expressivenesses that are normalized by the normalization layer 970.

In an example, the training apparatus 900 may further include classifiers that classify an expression of an input image. In this example, the training apparatus 900 learns expressions of the plurality of frames by applying the features extracted by the first neural networks 910 to the classifiers.

The third neural network 950 is trained to universally rank expressivenesses of the facial expressions of the images of the plurality of frames through a comparison to an expressiveness of a pre-learned image. The training apparatus 900 universally ranks the expressivenesses of the facial expressions of the images of the plurality of frames by applying the expressivenesses of the facial expressions of the images of the plurality of frames to the third neural network 950. In this example, a ranking loss with respect to sequences (Ranking loss(sequences)) occurring in a process of ranking the sequences and/or a metric loss with respect to sequences (Metric loss (sequences)) occurring in a process of converting the sequences to metric occur in the third neural network 950. The metric loss with respect to the sequences corresponds to the loss 860 of FIG. 8.

In an example, the ranking loss with respect to the sequences is further used to train the third neural network 950. In this example, the third neural network 950 may further output rankings of frames in a number of sequences. The rankings of the frames indicate an order in which the frames are arranged based on expressivenesses of the facial expressions. The ranking loss with respect to the sequences is used to train the third neural network 950 such that the rankings output from the third neural network 950 accord with actual rankings.

The normalization layer 970 is trained to normalize the universally ranked expressivenesses of the facial expressions of the images of the plurality of frames to universal expressivenesses based on a pre-defined normalization function. In this example, the training apparatus 900 regressively applies the normalized universal expressivenesses to a neural network, for example, a second neural network, that performs an individual ranking process for each user through statistics for each sequence and a neural network, for example, a third neural network, that universally ranks the expressivenesses of the facial expressions of the images of the plurality of frames, thereby enabling self-learning and updating of the expressivenesses.

Figure 10:
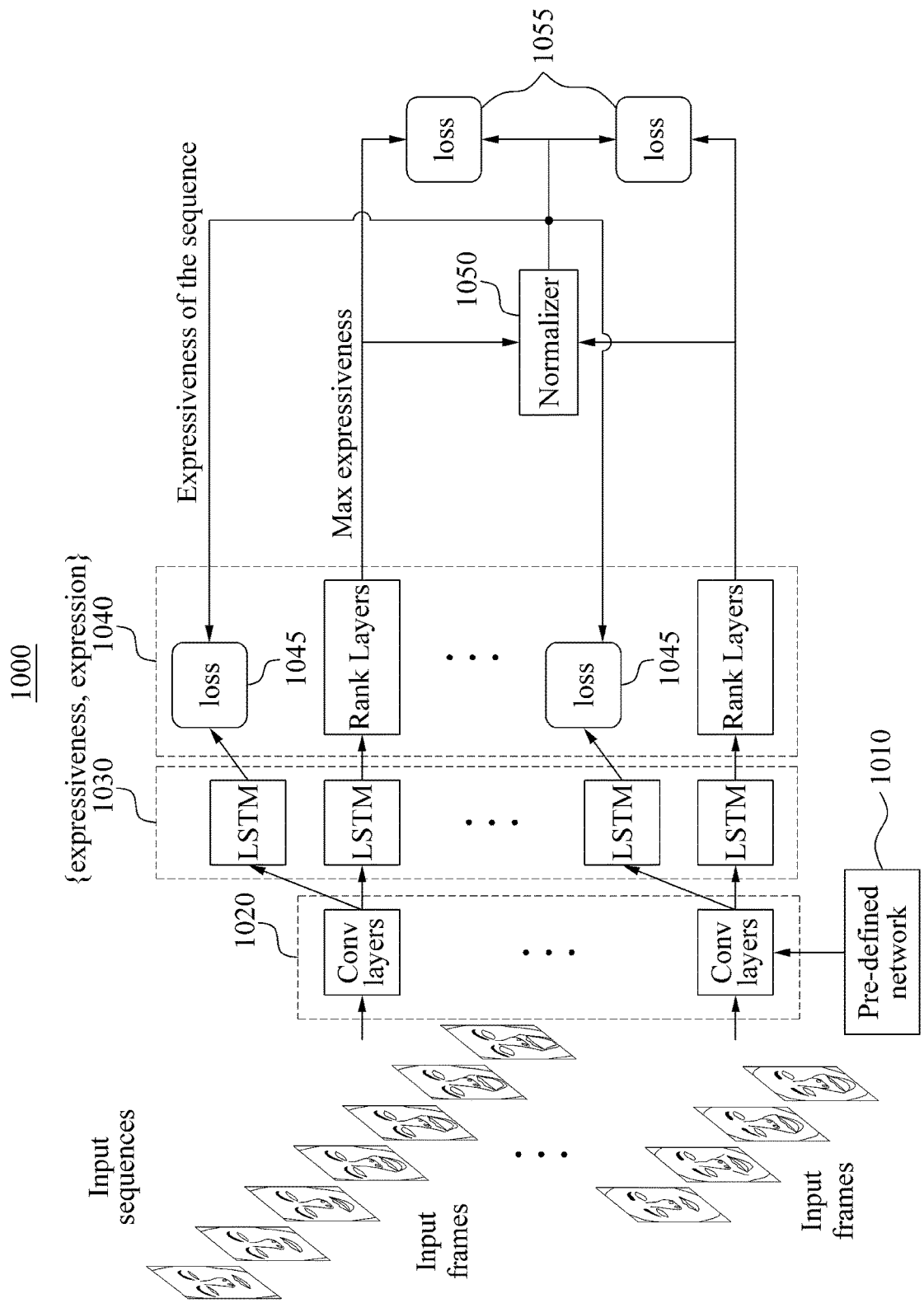

FIG. 10 illustrates an example of a structure and an operation of a training apparatus for expression recognition. Referring to FIG. 10, a training process in which a training apparatus 1000 normalizes expressivenesses of a plurality of input sequences by semi-supervised learning through a pre-defined network 1010 is illustrated. In an example, the training apparatus of FIG. 10 may correspond to the expression apparatus of FIGS. 5, 8, 9, and 13, e.g., to both perform training and inference operations for expression determining by implementing the trained neural networks, and may be one or more separate apparatus(es) that perform the training.

The training apparatus 1000 includes one or more neural networks to normalize the expressivenesses of the plurality of input sequences. The training apparatus 1000 includes the pre-defined network 1010 to output an initial expressiveness, a first neural network 1020 including convolutional layers that extract features from the plurality of input sequences, a second neural network 1030 including long-short term memory (LSTM) recurrent layers for sequential learning, a third neural network 1040 including rank layers for a universal ranking process, and a normalizer 1050 including normalization layers to output finally normalized expressivenesses.

In detail, the pre-defined network 1010 determines initial facial expressions and expressivenesses of the facial expressions before normalizing the expressivenesses of the plurality of input sequences, and corresponds to an expression recognizing network trained based on existing classification. In this example, the expressivenesses differ based on types of pre-defined expressions.

The first neural network 1020, the second neural network 1030, the third neural network 1040, and the normalizer 1050 operate similar to the first neural networks 910, the second neural networks 930, the third neural network 950, and the normalization layer 970 of FIG. 9, respectively, and thus reference is made to the corresponding description. In this example, a first loss 1045 occurring in the third neural network 1040 corresponds to the loss 860 of FIG. 8. Further, a second loss 1055 occurring in the normalizer 1050 corresponds to the loss 870 of FIG. 8.

Figure 11:
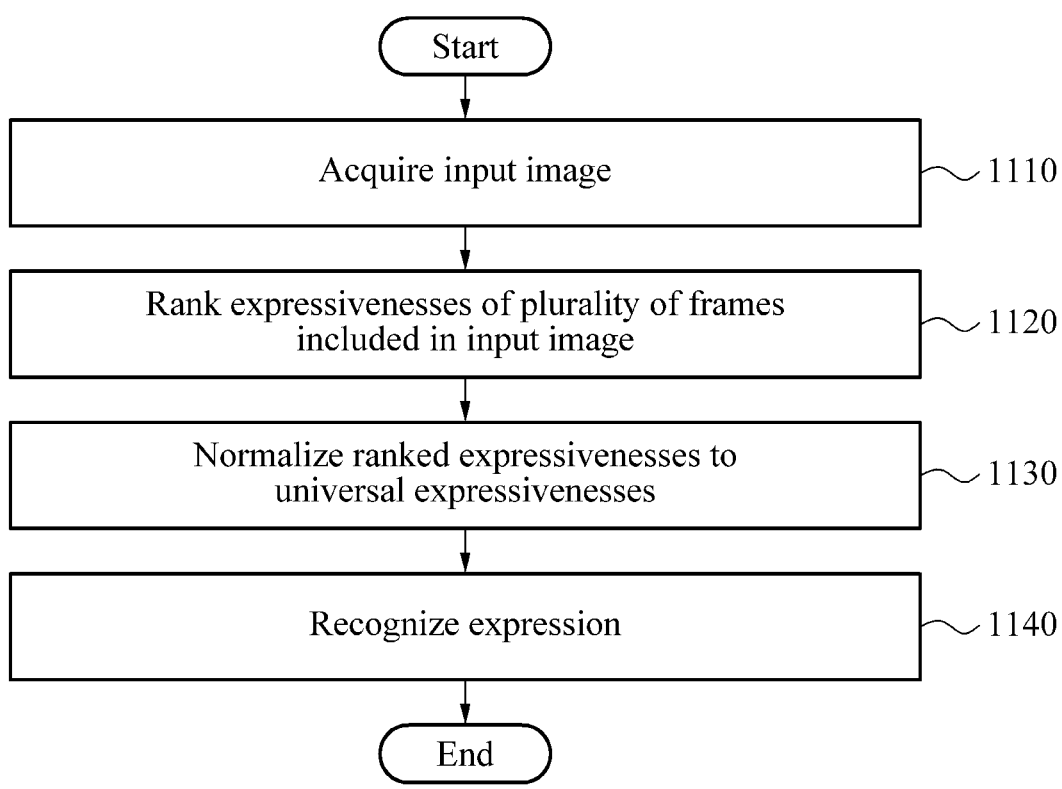
FIG. 11 illustrates an example of an expression recognizing method.

FIG. 11 illustrates an example of an expression recognizing method.

The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware or one or more processors and computer instructions.

In addition to the description of FIG. 11 below, the descriptions of FIGS. 1A, 1B, 1C, and 2-10 are also applicable to FIG. 11, and are incorporated herein by reference. Thus, the above description may not be repeated here.

Referring to FIG. 11, in operation 1110, an expression recognizing apparatus acquires an input image. In this example, the input image may include a plurality of frames including a predetermined facial expression, for example, a smiling expression, of a user. The expression recognizing apparatus may acquire the input image through a sensor included in the expression recognizing apparatus, or may acquire the input image captured or photographed outside of the expression recognizing apparatus through an interface of the expression recognizing apparatus.

In operation 1120, the expression recognizing apparatus ranks expressivenesses of facial images in the plurality of frames included in the input image. The expression recognizing apparatus estimates the expressivenesses of facial images in the plurality of frames based on features extracted from the input image, and ranks the expressivenesses of the facial images in the plurality of frames. For example, the input image may include five frames, from a first frame through a fifth frame, showing a smiling expression, an expressiveness of the first frame is "0.2", an expressiveness of the second frame is "0.38", an expressiveness of the third frame is "0.8", an expressiveness of the fourth frame is "0.1", and an expressiveness of the fifth frame is "0.5". The expression recognizing apparatus ranks the expressivenesses of the facial expression of the images in the plurality of frames in an order of the fourth frame ("0.1"), the first frame ("0.2"), the second frame ("0.38"), the fifth frame ("0.5"), and the third frame ("0.8").

In operation 1130, the expression recognizing apparatus normalizes the ranked expressivenesses of the facial expressions, to universal expressivenesses. The expression recognizing apparatus normalizes the universally ranked expressivenesses (of the plurality of frames) to the universal expressivenesses based on a pre-defined normalization function.

In operation 1140, the expression recognizing apparatus recognizes a facial expression of the user included in the input image based on the normalized universal expressivenesses.

Figure 12:
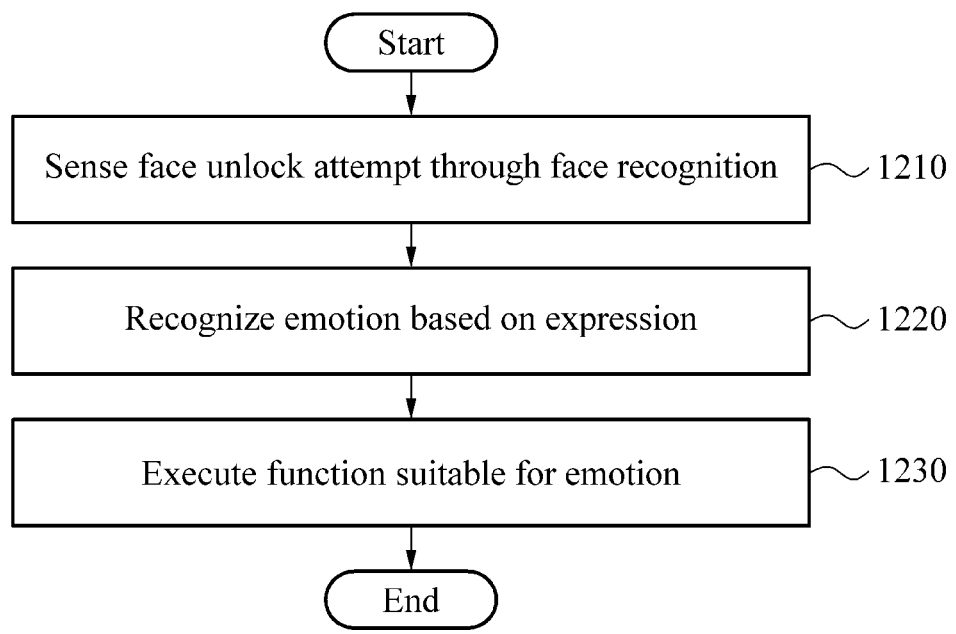
FIG. 12 illustrates an example of executing a function of an expressive recognition apparatus based on a recognized expression.

FIG. 12 illustrates an example of executing a function based on a recognized expression.

The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. One or more blocks of FIG. 12, and combinations of the blocks, can be implemented by special purpose hardware-based computer that perform the specified functions, or combinations of special purpose hardware or one or more processors and computer instructions.

In addition to the description of FIG. 12 below, the descriptions of FIGS. 1A, 1B, 1C, and 2-11 are also applicable to FIG. 12, and are incorporated herein by reference. Thus, the above description may not be repeated here.

Referring to FIG. 12, a process of performing various functions related to the emotions of users through expression based emotion recognition is illustrated.

In operation 1210, an apparatus that includes a facial recognition system may sense that a user is attempting to unlock the apparatus by implementing a facial recognition process. The apparatus may sense the face unlock attempt through a facial recognition operation by implementing a touch input on a touch screen, an input of an image sensor, or other input interfaces in various examples.

In operation 1220, in response to sensing the face unlock attempt, the apparatus recognizes an emotion based on a facial expression of the user. In this example, the apparatus may recognize the facial expression of the user based on the expression recognizing method described with reference to any one, any combination, or all of FIGS. 1A through 11, and recognize the emotion of the user based on the recognized facial expression. For example, the recognized facial expression of the user is determined to have a universal expressiveness of "0.9" with respect to a happy facial expression. In this example, the apparatus recognizes the emotion of the user as a very joyful state or very happy state based on the recognized facial expression.

In operation 1230, the apparatus executes a function suitable for the recognized emotion. The apparatus executes a function suitable for the emotional state of the user, for example, a very joyful state, for example, by providing a bright background image or providing rhythmical music, as non-limiting examples.

Figure 13:
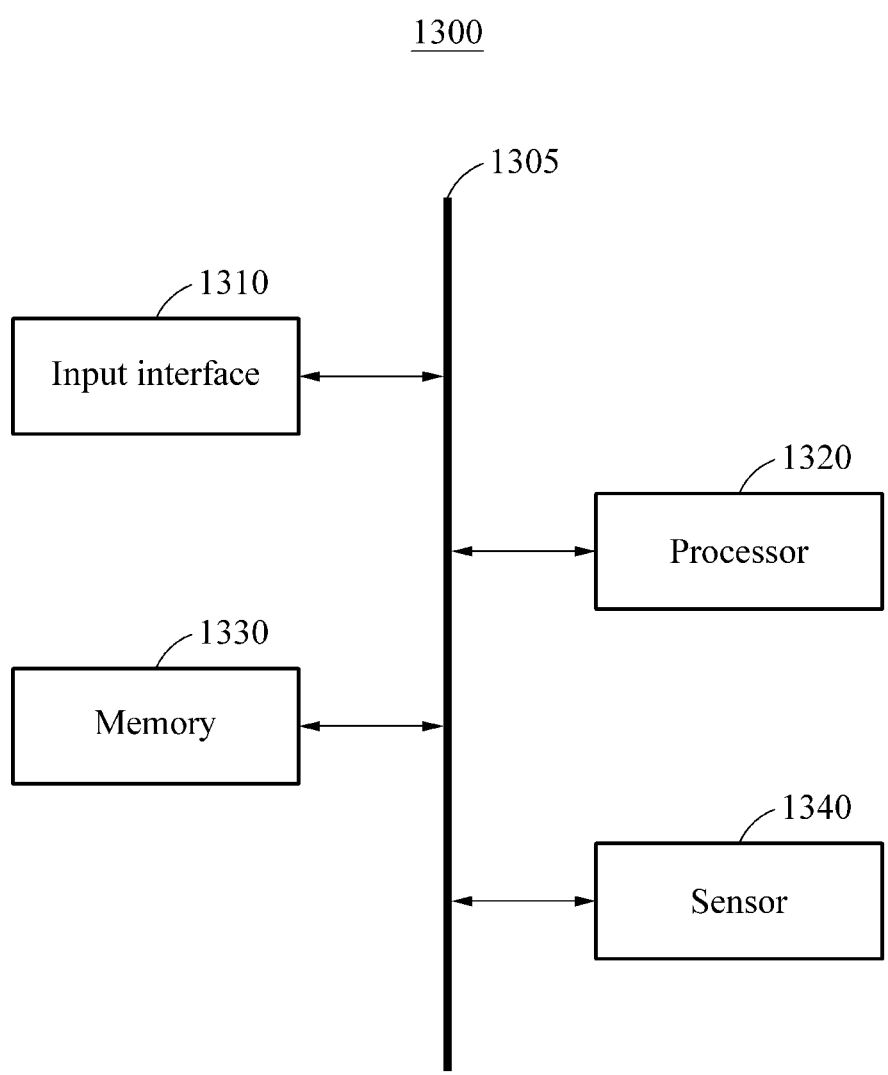
FIG. 13 illustrates an example of an expression recognizing apparatus.

FIG. 13 illustrates an example of an expression recognizing apparatus. Referring to FIG. 13, an expression recognizing apparatus 1300 includes an input interface 1310 and a processor 1320. The expression recognizing apparatus 1300 further includes a memory 1330 and a sensor 1340. The input interface 1310, the processor 1320, the memory 1330, and the sensor 1340 communicate with each other through a communication bus 1305.

The input interface 1310 may acquire an input image including a face of a user.

The processor 1320 may extract a feature from the input image. The processor 1320 may estimate an expression of the input image and an expressiveness of a facial expression of the input image corresponding to an expression intensity of the facial expression based on the feature. The processor 1320 may normalize the expressiveness of the facial expression of the input image to a universal expressiveness, and recognize the expression based on the universal expressiveness.

The processor 1320 extracts the feature with respect to the expression of the input image based on a first neural network including layers trained with expressions having different expressivenesses of the facial expression. In this example, the first neural network may include shared convolutional layers. The processor 1320 may estimate the facial expression of the input image by applying the feature to a classifier trained to classify the facial expression of the input image, and/or estimate the expressiveness of the facial expression of the input image by applying the feature to a second neural network trained to estimate the expressiveness of the facial expression of the input image.

The processor 1320 may apply the expressiveness of the facial expression of the input image to a third neural network trained to universally rank the expressiveness of the facial expression of the input image through a comparison to an expressiveness of a pre-learned image. The processor 1320 may normalize the universally ranked expressiveness of the facial expression of the input image based on a pre-defined normalization function. In addition, the processor 1320 may perform the at least one method described with reference to FIGS. 1 through 12.

The memory 1330 stores computer-readable instructions. In response to the instructions stored in the memory 1330 being executed by the processor 1320, the processor 1320 processes operations related to the expression recognition described above. Further, the memory 1330 stores the input image, the expression of the input image, the expressiveness of the input image, and/or the universal expressiveness to which the expressiveness of the input image is normalized. For example, the memory 1330 stores parameters with respect to a plurality of neural networks and a plurality of classifiers.

The sensor 1340 includes any one or any combination of an image sensor, a proximity sensor, and an infrared sensor to capture the input image. The sensor 1340 captures the input image using a well-known scheme, for example, a scheme of converting an optical image into an electrical signal. The sensor 1340 transmits any one or any combination of a captured color image, a captured depth image, and a captured infrared image to any one or any combination of the processor 1320 and the memory 1330.

The processor 1320 executes the instructions or programs, or controls the expression recognizing apparatus 1300. The expression recognizing apparatus 1300 is connected to an external device, for example, a personal computer or a network, through an input/output device (not shown), and exchanges data with the external device. The expression recognizing apparatus 1300 is representative of, or implemented as, at least a portion of one or more of mobile devices such as a mobile phone, a smart phone, a personal digital assistant (PDA), a tablet computer and a laptop computer, computing devices such as a personal computer and a netbook, or electronic products such as a television and a smart television. In addition, the above description is applicable to the expression recognizing apparatus 1300, and thus duplicate description will be omitted here for conciseness.

The expression recognizing apparatuses 500 and 1300, the training apparatuses 800, 900 and 1000, the input interface 1310, the processor 1320, the sensor 1340, the memory 1330, and other apparatuses, modules, devices, and other components described herein with respect to FIGS. 1-13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 7, and 11-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A processor-implemented method comprising:
obtaining an input image including a face of a user;
extracting a feature from the input image;
estimating a facial expression of the input image and an individual expressiveness of the facial expression of the input image corresponding to a determined expression intensity of the facial expression based on the extracted feature;

normalizing the individual expressiveness of the facial expression of the input image to a universal expressiveness; and recognizing the facial expression based on the universal expressiveness, wherein the normalizing of the individual expressiveness normalizes an individual expressiveness of the user to a universal expressiveness based on a relative difference in expressiveness between users with respect to a same expression.

2. The method of claim 1, wherein the input image includes any one of a single image including a single frame and a sequence image including a plurality of frames.

3. The method of claim 1, wherein the extracting of the feature comprises extracting a feature with respect to the facial expression of the input image based on a first neural network comprising layers trained with facial expressions which have different individual expressivenesses.

4. The method of claim 1, wherein the estimating of the facial expression comprises any one or any combination of:
estimating the facial expression of the input image by applying the feature to a classifier trained to classify the facial expression of the input image; and
estimating the individual expressiveness of the facial expression of the input image by applying the feature to a second neural network trained to estimate the individual expressiveness of the facial expression of the input image.

5. The method of claim 1, wherein the normalizing comprises:
universally ranking the individual expressiveness of the facial expression of the input image by applying the individual expressiveness of the facial expression of the input image to a third neural network trained to universally rank the individual expressiveness of the facial expression of the input image through a comparison to an expressiveness of a pre-learned image; and
normalizing the universally ranked individual expressiveness of the facial expression of the input image to the universal expressiveness based on a pre-defined normalization function.

6. The method of claim 5, wherein the normalization function is based on a maximum value of the individual expressiveness of the facial expression of the input image and a minimum value of the individual expressiveness of the facial expression of the input image.

7. The method of claim 1, wherein the extracting of the feature comprises extracting a feature with respect to the facial expression of each of a plurality of frames of the input image based on a first neural network including layers trained with facial expressions which have different individual expressivenesses.

8. The method of claim 7, wherein the estimating of the facial expression comprises any one or any combination of:
estimating the facial expression of each of the plurality of frames by applying the feature to a classifier trained to classify the facial expression of the input image; and
estimating an individual expressiveness of the facial expression of each of the plurality of frames by applying the feature to a second neural network trained to estimate the individual expressiveness of the facial expression of the input image.

9. The method of claim 8, wherein the normalizing comprises:

universally ranking the individual expressiveness of the facial expression of each of the plurality of frames by applying the individual expressiveness of the facial expression of each of the plurality of frames to a third neural network trained to universally rank the individual expressiveness of the facial expression of each of the plurality of frames through a comparison to an expressiveness of a pre-learned image; and
normalizing the universally ranked individual expressiveness of the facial expression of each of the plurality of frames to the universal expressiveness based on a pre-defined normalization function.

10. The method of claim 1, further comprising capturing the input image including the image of the user, and transmitting the captured image to a user interface.

11. The method of claim 1, further comprising recognizing an emotion of the user based on the recognized facial expression.

12. The method of claim 1, further comprising:
labeling the input image with a universal expressiveness corresponding to the input image.

13. A non-transitory computer-readable storage medium storing instructions that, when executed by a processor, cause the processor to perform the method of claim 1.

14. The method of claim 1, further comprising determining different individual expressiveness of the user with respect to a same expression of an emotion.

15. A processor-implemented method comprising:
acquiring training images corresponding to different facial expressions and individual expressivenesses of the different facial expressions;
extracting a feature with respect to a facial expression of each of the training images based on a first neural network;
classifying the facial expression of each of the training images based on the feature;
training a second neural network to estimate the individual expressiveness of the facial expression corresponding to each of the training images based on the feature;
training a third neural network to universally rank the individual expressiveness of the facial expression corresponding to each of the training images; and
normalizing the individual expressiveness of the facial expression to a universal expressiveness,
wherein the normalizing of the individual expressiveness normalizes an individual expressiveness of the user to a universal expressiveness based on a relative difference in expressiveness between users with respect to a same expression.

16. The method of claim 15, further comprising:
training the first neural network by applying the training images to the first neural network including shared convolutional layers configured to extract a feature with respect to an expression of a facial image.

17. The method of claim 15, wherein the second neural network includes recurrent layers configured to estimate the individual expressiveness of the facial expression corresponding to each of the training images, and
the training of the second neural network comprises training the second neural network by applying the extracted feature to the second neural network.

18. The method of claim 17, wherein the training of the second neural network comprises training the second neural network to estimate the individual expressiveness of the facial expression corresponding to each of the training images by individually ranking the individual expressiveness of the facial expression corresponding to each of the training images with respect to each user.

19. The method of claim 15, wherein the third neural network includes recurrent layers configured to universally rank the individual expressiveness of the facial expression corresponding to each of the training images by comparing the individual expressiveness of the facial expression to an expressiveness of a pre-learned image, and the training of the third neural network comprises training the third neural network to universally rank the individual expressiveness of the facial expression corresponding to each of the training images by applying the individual expressiveness of the facial expression corresponding to each of the training images to the third neural network.

20. An apparatus comprising:
an input interface configured to acquire an input image of a face of a user; and
a processor configured to
extract a feature from the input image,
estimate a facial expression of the input image and an individual expressiveness of the facial expression of the input image corresponding to an expression intensity of the expression based on the extracted feature,
normalize the individual expressiveness of the facial expression of the input image to a universal expressiveness, and
recognize the facial expression based on the universal expressiveness,
wherein the normalizing of the individual expressiveness normalizes an individual expressiveness of the user to a universal expressiveness based on a relative difference in expressiveness between users with respect to a same expression.

21. The apparatus of claim 20, wherein the processor is further configured to extract the feature with respect to the facial expression of the input image based on a first neural network including layers trained with facial expressions having different individual expressivenesses.

22. The apparatus of claim 20, wherein the processor is further configured to perform any one or any combination of estimating the facial expression of the input image by applying the extracted feature to a classifier trained to classify the facial expression of the input image, and estimating the individual expressiveness of the facial expression of the input image by applying the extracted feature to a second neural network trained to estimate the individual expressiveness of the input image.

23. The apparatus of claim 20, wherein the processor is further configured to universally rank the individual expressiveness of the facial expression of the input image by applying the individual expressiveness of the facial expression of the input image to a third neural network trained to universally rank the individual expressiveness of the facial expression of the input image by comparing the facial expression of the input image to an expressiveness of a pre-learned image, and normalize the universally ranked individual expressiveness of the facial expression of the input image based on a pre-defined normalization function.

24. A processor-implemented method comprising:
receiving an input image including a facial expression of a user;
extracting a feature from the input image;
estimating an individual expressiveness of the facial expression based on the extracted feature;
normalizing the estimated individual expressiveness of the facial expression of the input image to a universally ranked expressiveness;
recognizing the facial expression based on the universal expressiveness;
recognizing an emotion of the user based on the recognized facial expression, and
performing a function based on the recognized emotion of the user,
wherein the normalizing of the individual expressiveness normalizes an individual expressiveness of the user to a universal expressiveness based on a relative difference in expressiveness between users with respect to a same expression.

* * * * *